US012672221B2

(12) United States Patent
Tryputska

(10) Patent No.: US 12,672,221 B2
(45) Date of Patent: Jun. 30, 2026

(54) DETERMINING OUTPUT INFORMATION BASED ON A RECOMMENDED USE OF A LIGHTING SYSTEM

(71) Applicant: SIGNIFY HOLDING B.V., Eindhoven (NL)

(72) Inventor: Siarhei Tryputska, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 51 days.

(21) Appl. No.: 18/726,557

(22) PCT Filed: Dec. 19, 2022

(86) PCT No.: PCT/EP2022/086660
§ 371 (c)(1),
(2) Date: Jul. 3, 2024

(87) PCT Pub. No.: WO2023/126234
PCT Pub. Date: Jul. 6, 2023

(65) Prior Publication Data

US 2025/0071876 A1 Feb. 27, 2025

(30) Foreign Application Priority Data

Jan. 3, 2022 (EP) .................................... 22150012

(51) Int. Cl.
*H05B 47/165* (2020.01)
*H05B 47/105* (2020.01)
*H05B 47/175* (2020.01)
*H05B 47/19* (2020.01)

(52) U.S. Cl.
CPC ......... *H05B 47/165* (2020.01); *H05B 47/105* (2020.01); *H05B 47/19* (2020.01); *H05B 47/1965* (2024.01); *H05B 47/196* (2024.01)

(58) Field of Classification Search
CPC .... H05B 47/105; H05B 47/165; H05B 47/19; H05B 47/1965; H05B 47/196
See application file for complete search history.

(56) References Cited

U.S. PATENT DOCUMENTS

| | | | | |
|---|---|---|---|---|
| 2011/0028138 | A1* | 2/2011 | Davies-Moore | G06F 3/04817 455/418 |
| 2016/0232131 | A1* | 8/2016 | Liu | G06F 40/103 |
| 2016/0322082 | A1* | 11/2016 | Davis | H04W 8/22 |
| 2018/0098408 | A1* | 4/2018 | Hubbers | H05B 47/155 |
| 2018/0307473 | A1* | 10/2018 | Keen | H04L 67/535 |
| 2019/0237108 | A1* | 8/2019 | Davis | G06F 3/0485 |

* cited by examiner

*Primary Examiner* — Raymond R Chai

(57) ABSTRACT

A system for determining output information based on a recommended use of a lighting system and outputting the output information is configured to determine (101) a plurality of applications which have been installed on a device. The plurality of applications comprises a lighting control application for controlling the lighting system and one or more other applications. The system is further configured to determine (103) the recommended use of the lighting system based on an identifier or a type of the one or more other applications and determine (105) the output information based on the recommended use of the lighting system. The system is further configured to output (107) the output information via an output interface.

13 Claims, 3 Drawing Sheets

DETERMINING OUTPUT INFORMATION BASED ON A RECOMMENDED USE OF A LIGHTING SYSTEM

CROSS-REFERENCE TO PRIOR APPLICATIONS

This application is the U.S. National Phase application under 35 U.S.C. § 371 of International Application No. PCT/EP2022/086660, filed on Dec. 19, 2022, which claims the benefit of European Patent Application No. 22150012.7, filed on Jan. 3, 2022. These applications are hereby incorporated by reference herein.

FIELD OF THE INVENTION

The invention relates to a system for determining output information based on a recommended use of a lighting system.

The invention further relates to a method of determining output information based on a recommended use of a lighting system.

The invention also relates to a computer program product enabling a computer system to perform such a method.

BACKGROUND OF THE INVENTION

Advanced connected lighting products like Philips' Hue products offer a wide range of functionality. For example, Hue Entertainment and Hue Sync enable dynamic lighting. A dynamic lighting system can dramatically influence the experience and impression of audio-visual material, e.g. when the colors sent to the lights match what would be seen in the composed environment around the screen. However, a dynamic lighting system cannot only be used to enhance screen content, but also to enhance the experience of listening to music, e.g. by using a software algorithm to analyze an audio stream in real-time and create light effects based on certain audio characteristics such as intensity and frequency bands.

As another example, Hue products can increase home security, for instance by mimicking a presence when a Hue owner is away from home. The Hue outdoor motion sensor can detect outdoor motion and can trigger both Hue indoor and outdoor lights. This can be used to welcome a user or guests home with lights, or detect intruders or potential package thieves with pre-set light scenes.

All this functionality can be controlled using an app. However, a user may not be aware of all the functionality that already is available to the user, and manually navigating through all available options is considered tedious by many users. Additionally, a product owner may not be aware of the functionality that may be added to his lighting system by adding additional components, e.g., sensors, to the lighting system.

US 2011/0028138 A1 describes a device and method that suggests available applications or features in which a user may be interested to the user based on the user's past and current mobile device usage patterns.

SUMMARY OF THE INVENTION

It is a first object of the invention to provide a system, which can be used to determine output information based on a recommended use of a lighting system.

It is a second object of the invention to provide a method, which can be used to determine output information based on a recommended use of a lighting system.

In a first aspect of the invention, a system for determining output information based on a recommended use of a lighting system and outputting said output information comprises at least one output interface and at least one processor configured to determine a plurality of applications which have been installed on a device, said plurality of applications comprising a lighting control application for controlling said lighting system and one or more other applications, determine said recommended use of said lighting system based on said one or more other applications, determine said output information based on said recommended use of said lighting system, and output said output information via said at least one output interface.

This system is able to determine a recommended use of the lighting system to (better) control the lighting system based on applications installed on a device, e.g., a mobile phone, tablet or a laptop or desktop PC, on which an application to control the lighting system is installed. That way, the user can be assisted to find and use the features that are likely to be relevant to the user. For example, the lighting system may have a plurality of uses, and each of these uses may be associated with one or more applications or application types. The system may detect applications that are installed on the device that are associated with a use of the lighting system, or that belong to an application type that is associated with a use of the lighting system. The system can then recommend the use of the lighting system associated with the detected application or application type.

For example, the lighting system may have a dynamic lighting use to enhance experience of media content that is being played, a security lighting use, and so on. The lighting system may be controlled by an application installed on a device, e.g., a mobile phone. If a user then has a music streaming app installed on the device, the system may detect the presence of the music streaming app and determine output to suggest the user to use dynamic lighting to enhance the user's listening experience, or output instructing the user on how to use the dynamic lighting app. Similarly, if the system detects the presence of a home security app, the system may determine output informing the user of and/or instructing the user how to use security-related lighting features, such as a presence mimicking routine.

The output information may include information about a device that can be added to the lighting system. For example, if the recommended use is a security feature, indoor and/or outdoor motion sensors may be suggested to be added to the system. Alternatively, uses that require a device to be added to the lighting system may be excluded from the recommended use(s).

Support in the Operating System may be needed in order to determine the plurality of applications which have been installed on the device. For example, in Android OS, it is possible to query identifiers of all installed applications. Other operating systems may support this as well, either now or in the future.

Said at least one processor may be configured to determine said recommended use of said lighting system based on an identifier or a type of at least one of said one or more other applications. For example, a recommended use may be associated with an application type (category) such as "music", "video", "security", or "games" if the other applications are associated with application types. An application may be associated with more than one application types. Some applications on the device may be associated with no application type. The use of application types makes it possible to map a large number of different applications which need not all be known, individually, to the system. A identifier typically identifies a single application. A single identifier may be used to identify multiple versions of a single application.

Said at least one processor may be configured to determine a quantity of installed applications for each of a plurality of application types based on said one or more other applications, select one or more of said plurality of application types based on said determined quantities, and determine said recommended use of said lighting system based on said selected one or more application types. It may be assumed that if a user has a large quantity of applications associated with one application type, that one application type has a high relevance to the user. This, in turn, makes it more likely that the user is interested in the determined output information. The number at which a quantity is considered 'large' may depend on the application type.

Said at least one processor may be configured to determine said recommended use of said lighting system by determining a recommended light scene and/or recommended light routine. A light scene typically specifies at least a color and a brightness/light output level. A light scene may be static or dynamic. Examples of scenes include an energize scene and a nightlight scene. Examples of routines (automations) include a fall asleep routine, a wakeup routine, and a presence mimicking routine.

Said at least one processor may be configured to output said output information by transmitting configuration information to said lighting system to configure said recommended use in said lighting system. As a first example, a light scene may be added to the lighting system such that the light scene can be recalled by the user (e.g. on the user's mobile phone) or can be activated automatically by a light routine. As a second example, a light routine may be added to the lighting system such that the light routine is automatically (optionally after user confirmation) performed or can be selected by the user. The configuration information may be transmitted to a bridge or other controller of the lighting system, for example Said output information may specify said recommended use of said lighting system. This makes it easier for the user to identify and/or understand the recommended use, or, for example, to search for the recommended use, to search more information about the recommended use and/or products associated with the recommended use, et cetera. This may be in addition to or instead of the lighting system being configured with said recommended use.

Said at least one processor may be configured to determine said plurality of applications and said recommended use of said lighting system upon detecting that said lighting control application is being used for a first time. This way, the user may be assisted to set up the lighting control application in the most suitable way. The number of uses or options available in the lighting control application can be very large, and hence potentially overwhelming to a user. Therefore, it may be desirable to present only a limited number of uses to the user. By basing the uses that are recommended to the user on the other applications installed on the device, and potentially on patterns learned from uses used by other users and the applications these other users have installed, the most relevant uses can be recommended. This is likely to improve user satisfaction.

Said at least one processor may be configured to transmit request information specifying said one or more other applications to a further system, receive result information indicative of said recommended use of said lighting system from said further system, and determine said recommended use of said lighting system based on said result information. Said further system can be a server system, for example. This way, the system can remain relatively lightweight, as it does not need to be able to recognize every application in order to assign an application type to the application.

Said at least one processor may be configured to determine one or more actual uses of said lighting system and transmit further output information indicative of said one or more actual uses of said lighting system to said further system to allow said further system to determine a recommended use of another lighting system for another user based on a relation between said one or more other applications and said one or more actual uses of said lighting system. This way, a correlation may be determined between uses, e.g., features, of the lighting system that may be recommended, and the presence, quantity, and/or usage of other applications or types of applications. This, in turn, may increase the relevance of a recommended for the other user. Alternatively, a manufacturer of the lighting products may associate uses with application identifiers and/or application types itself, e.g. based on user tests and/or its own knowledge.

Said at least one processor may be configured to determine lighting control synchronized to rendered audio and/or video as said recommended use of said lighting system if said one or more other applications comprise an audio and/or video streaming application.

Said at least one processor may be configured to determine a timer routine as said recommended use of said lighting system if said one or more other applications comprise a fitness application. The timer routine may be used to indicate when the time set for a workout is over.

Said at least one processor may be configured to determine lighting control which depends on a home or away status as said recommended use of said lighting system if said one or more other applications comprise a running application and/or a cycling application. The lighting control may, for example, be configured to turn lights off when the user leaves home, e.g., to go running or cycling, and to turn on the lights when the user comes back or is about to come back.

Said at least one processor may be configured to determine a presence mimicking routine and/or a presence detection routine as said recommended use of said lighting system if said one or more other applications comprise a security application.

Thus, the recommended use may be related to the other application or other application type.

In a second aspect of the invention, a method of determining output information based on a recommended use of a lighting system and outputting said output information comprises determining a plurality of applications which have been installed on a device, said plurality of applications comprising a lighting control application for controlling said lighting system and one or more other applications, determining said recommended use of said lighting system based on said one or more other applications, determining said output information based on said recommend use of said lighting system and outputting said output information. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for determining output information based on a recommended use of a lighting system and outputting said output information.

The executable operations comprise determining a plurality of applications which have been installed on a device, said plurality of applications comprising a lighting control application for controlling said lighting system and one or more other applications, determining said recommended use of said lighting system based on said one or more other applications, determining said output information based on said recommend use of said lighting system and outputting said output information.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
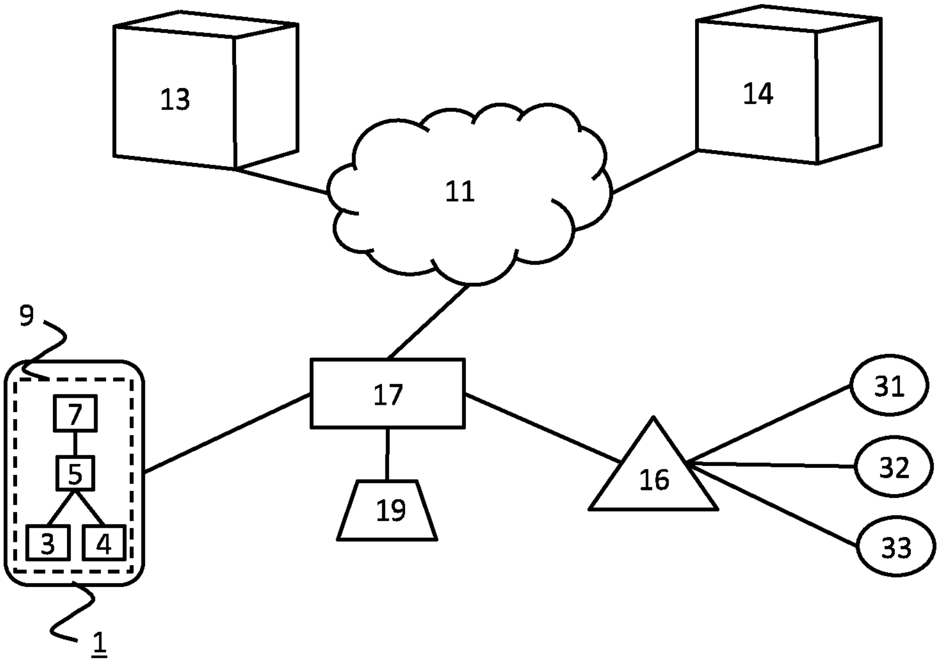
FIG. 1 is a block diagram of a first embodiment of the system.

FIG. 1 shows a first embodiment of the system for determining output information based on a recommended use of a lighting system. In this first embodiment, the system is a mobile device 1. A lighting control application is installed on mobile device 1. Using the lighting control application, the mobile device 1 is able to control lighting devices 31-33 via a wireless LAN access point 17 and a bridge 16, and optionally via an Internet server 13, e.g., of the manufacturer of the lighting devices 31-33. Lighting devices 31-33 may be Philips Hue lamps, for example. The lighting devices 31-33 communicate with the bridge 16, e.g., using Zigbee technology. The bridge 16 may be a Philips Hue bridge, for example. The bridge 16 is connected to the wireless LAN access point 17, e.g., via Wi-Fi or Ethernet. In the depicted example, the lighting system comprises the bridge 16 and the lighting devices 31-33.

One or more other applications are also installed on the mobile device 1. The one or more other applications can comprise, for example, an audio and/or video streaming application, a fitness application, a running application and/or cycling application, or a security application. In the depicted example, the one or more other applications comprise an audio streaming application. Using the audio streaming application, the mobile device 1 is able to control playback of audio segments, e.g. songs, via an Internet server 14, e.g. of a music streaming service such as Spotify. In the example of FIG. 1, music is streamed to an audio system 19, e.g. a smart and/or Wi-Fi speaker system or an A/V receiver. The music system 19 is connected to the wireless LAN access point 17 and streams music directly from the Internet server 14 via Wi-Fi. The wireless LAN access point 17 is connected to the Internet 11. The Internet servers 13 and 14 are also connected to the Internet 11. Instead of single Internet servers, clusters of Internet servers may be used. These clusters may be part of one or more clouds.

The mobile device 1 comprises a transceiver 3, a transmitter 4, a processor 5, memory 7, and at least one output interface. In the depicted example, the at least one output interface is a touchscreen display 9. The audio streaming application can configure the processor 5 to control, via the transmitter 4, playback of an audio segment, e.g. via an API of the Internet server 14. The lighting control application can configure the processor 5 to control, via the transmitter 4, the lighting devices 31-33 to render light effects. Each light effect is rendered at a rendering moment. In this example, the lighting system can be configured such that the light effects and rendering moments can be based on characteristics of the audio segment. This way, dynamic lighting can be used to enhance the listening experience. In order to use dynamic lighting, dynamic lighting may need to be activated in the lighting control application. Additionally, one or more devices, e.g., the mobile device 1 and/or the bridge 16, may need to be configured to enable dynamic lighting.

If the user is not already using dynamic lighting, the processor 5 is configured to determine output information based on a recommended use of a lighting system, in this case dynamic lighting, and to output the determined output information via the touchscreen display 9. In particular, the processor 5 is configured to determine a plurality of applications which have been installed on the mobile device 1. In the depicted example, the plurality of applications comprises the lighting control application and the audio streaming application.

The processor 5 is configured to determine the recommended use of the lighting system based on the one or more other applications. For example, if the user has not yet activated and/or configured dynamic lighting, the processor 5 can identify dynamic lighting as a recommended use based on the audio streaming device being installed on the mobile device 1. In other examples, the processor 5 may be configured to determine the recommended use of the lighting system by determining a recommended light scene (e.g. night light) and/or recommended light routine (e.g. presence mimicking when away from home).

The processor 5 may be configured to determine the recommended use of the lighting system based on an identifier or a type of at least one of the one or more other applications. In the depicted example, the recommended use "dynamic lighting" can be associated with application types such as "music" and "video". The music streaming application can be associated with the application type "music". By using application types, it is not necessary to map each individual application on a potential use of the lighting system.

The processor 5 is configured to determine output information based on the recommended use of the lighting system. The output information may specify the recommended use of the lighting system. This makes it easier for the user to identify and/or understand the recommended use or, for example, to search for the recommended use, to search more information about the recommended use and/or products associated with the recommended use, et cetera. The output information can also comprise configuration information to configure the recommended use, e.g. light scene or light routine, in the lighting system.

The processor 5 is further configured to output the output information via the output interface. For example, the processor 5 can create a message informing the user about the existence of dynamic lighting, or a message asking the user whether to activate dynamic lighting. The processor is further configured to display the message on the touchscreen display 9.

If the output information comprises configuration information, the processor 5 can be configured to transmit the configuration information to the lighting system, for example to bridge 16. This way, the recommended use, e.g., dynamic lighting, can be configured in the lighting system. The configuration information can be transmitted prior to or together with displaying the messages, so that a user can directly experience the recommended use. Alternatively, the configuration information is only transmitted after the user has indicated that the lighting control application should do so, for example in response to the displayed message.

In the depicted example, the one or more other applications comprise an audio streaming application and the processor 5 is configured to determine lighting control synchronized to rendered audio as the recommended use of the lighting system if. In another example, the one or more other applications can, additionally or alternatively, comprise a video streaming application and the processor 5 may be configured to determine lighting control synchronized to rendered audio and/or video as the recommended use of the lighting system if.

In another example, the processor 5 may be configured to determine a timer routine as the recommended use of the lighting system if the one or more other applications comprise a fitness application. A timer routine can a user determine when the time set for a work-out routine has passed. For example, the lighting system may be configured to activate a lighting scene may that is conducive to physical work-out during the work-out routine, and to switch to a lighting scene that is conducive to relaxing after the time set for the work-out has passed. Alternatively or additionally, different lighting scene may be used to denote different parts of a work-out routine.

In another example, the processor 5 may be configured to determine lighting control which depends on a home or away status as the recommended use of the lighting system if the one or more other applications comprise a running application and/or a cycling application. For example, the indoor lights may be switched off while a user is out running or cycling, and may be switched on again when the user returns home or is about to return home.

The at least one processor may be configured to determine a presence mimicking routine and/or a presence detection routine as the recommended use of the lighting system if the one or more other applications comprise a security application. If the user does not yet have a motion detector sensor integrated into the lighting system, the output information may comprise information on motion detector sensors and, for example, a link to directly purchase a compatible motion detector sensor.

In the embodiment of the mobile device 1 shown in FIG. 1, the mobile device 1 comprises one processor 5. In an alternative embodiment, the mobile device 1 comprises multiple processors. The processor 5 of the mobile device 1 may be a general-purpose processor, e.g. from ARM or Qualcomm or an application-specific processor. The processor 5 of the mobile device 1 may run an Android or iOS operating system for example. The display 9 may comprise an LCD or OLED display panel, for example. The processor 5 may use touch screen display 9 to provide a user interface, for example. The memory 7 may comprise one or more memory units. The memory 7 may comprise solid state memory, for example.

The receiver 3 and the transmitter 4 may use one or more wireless communication technologies, e.g. Wi-Fi (IEEE 802.11) for communicating with the wireless LAN access point 17, for example. In an alternative embodiment, multiple receivers and/or multiple transmitters are used instead of a single receiver and a single transmitter. In the embodiment shown in FIG. 1, a separate receiver and a separate transmitter are used. In an alternative embodiment, the receiver 3 and the transmitter 4 are combined into a transceiver. The mobile device 1 may comprise other components typical for a mobile device such as a battery and a power connector. The invention may be implemented using a computer program running on one or more processors.

In the embodiment of FIG. 1, the lighting devices 31-33 are controlled by the mobile device 1 via the bridge 16. In an alternative embodiment, one or more of the lighting devices 31-33 are controlled by the mobile device 1 without a bridge, e.g. directly via Bluetooth or via the wireless LAN access point 17. Optionally, the lighting devices 31-33 are controlled via the cloud, e.g. via Internet server 13. The lighting devices 31-33 may be capable of receiving and transmitting Wi-Fi signals, for example.

Figure 2:
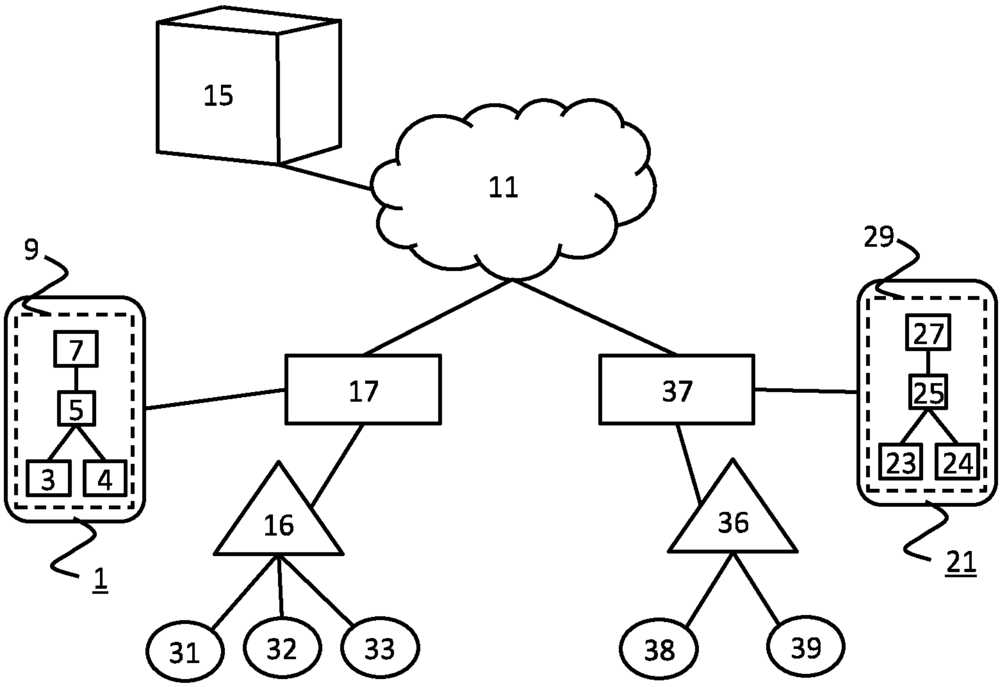
FIG. 2 is a block diagram of a second embodiment of the system.

FIG. 2 shows a second embodiment of the system for determining output information based on a recommended use of a lighting system. In this second embodiment, the system is the mobile device 1. A lighting control application is installed on mobile device 1. Using the lighting control application, the mobile device 1 is able to control lighting devices 31-33 via a wireless LAN access point 17 and a bridge 16. One or more other applications are also installed on the mobile device 1. The one or more other applications can comprise, for example, an audio and/or video streaming application, a fitness application, a running application and/or cycling application, or a security application.

The mobile device 1 comprises a transceiver 3, a transmitter 4, a processor 5, memory 7, and at least one output interface. In the depicted example, the at least one output interface is a touchscreen display 9. The processor 5 is configured to determine a plurality of applications that are installed on the mobile device 1, the plurality of applications comprising the lighting control application and the one or more other applications.

The processor 5 is configured to transmit request information specifying the one or more other applications to a further system, in this example the Internet server 15. The Internet server 15 may be controlled by the manufacturer of the lighting devices 31-33. The Internet server 15 may also be controlled by a third party. The mobile device 1 can transmit information to the Internet server 15 and receive information from the Internet server 15 through the Internet 11.

The Internet server 15 is configured to determine result information indicative of a recommended use of the lighting system based on the one or more other applications specified in the request information. The Internet server 15 may contain, for example, a database with applications and associated with one or more of these applications, potential uses of the lighting system that can be assumed to be of interest to a user of the respective application. Additionally or alternatively, the Internet server 15 may be configured to determine an application type, e.g., “music”, “video”, “games”, “fitness”, or “security” for one or more applications. Potential uses of the lighting system may then be associated with these application types. A potential use of the lighting system can be associated with one or more application types; for example, “dynamic lighting” may be associated with both “music” and “video”. An application type can be associated with one or more potential uses; for example, “music” may be associated with both “dynamic lighting” and “concentration light scene”. Some applications can be their own category, for example applications such as Spotify or Netflix that have been shown to be used often in combination with a lighting system use. An application type can also be associated with a product, for example, “Hue Sync” may be associated with “video” and “games”, and “Hue Go” may be associated with “fitness”.

The processor 5 is configured to receive result information indicative of the recommended use of the lighting system from the Internet server 15 and to determine the recommended use of the lighting system based on the result information. By outsourcing part of the determination of the recommended use to the Internet server 15, the software installed on the mobile device 1 can remain relatively lightweight. For example, the software does not need to be able to recognize every application in order to assign an application type to the application. Additionally, the use of an Internet server may make it easier to keep a database with, e.g., applications, application types, and recommended uses up to date.

The processor 5 is further configured to determine output information based on the recommended use of the lighting system and output the output information via the output interface.

Optionally, the processor 5 may be configured to determine one or more actual uses of the lighting system and transmit further output information indicative of the one or more actual uses of the lighting system to the Internet server 15. This allows the Internet server 15 to determine a recommended use of another lighting system for another user based on a relation between the one or more other applications and the one or more actual uses of the lighting system. This way, a correlation may be determined between uses, e.g., features, of the lighting system that may be recommended, and the presence, quantity, and/or usage of other applications or types of applications. This, in turn, may increase the relevance of a recommended for the other user.

In the depicted example, the other user has another mobile device 21. A lighting control application is installed on the other mobile device 21. The lighting control application installed on the other mobile device 21 can be the same or similar as the lighting control application installed on the mobile device 1. Using the lighting control application, the other mobile device 21 is able to control lighting devices 38-39 via a wireless LAN access point 37 and a bridge 36. The lighting devices 38-39 may be manufactured by the same manufacturer as the lighting devices 31-33, or by a different manufacturer. The other mobile device 21 comprises a transceiver 23, a transmitter 24, a processor 25, memory 27, and a touchscreen display 29. A lighting control application and one or more other applications have been installed on the other mobile device 21. The processor 25 is configured to determine a plurality of applications that are installed on the mobile device 1, the plurality of applications comprising the lighting control application and the one or more other applications.

The processor 25 is configured to transmit request information specifying the one or more other applications to the Internet server 15. The Internet server 15 is configured to determine result information based on the request information received from the other mobile device 21 and based on the request information (specifying the one or more other applications) received from the mobile device 1 and the further output information received from the mobile device 1. In a typical embodiment, the result information may be based on the request information and actual uses of a plurality of users. The Internet server 15 may determine correlations between actual uses and the presence of other applications on the systems providing the information. Consequently, result information can be based on users’ behavior, and therefore be more likely to be relevant to the user.

The processor 25 is configured to receive the result information indicative of the recommended use of the lighting system from the Internet server 15 and to determine the recommended use of the lighting system based on the result information.

The processor 25 is further configured to determine output information based on the recommended use of the lighting system and output the output information via the touchscreen display 29.

Figure 3:
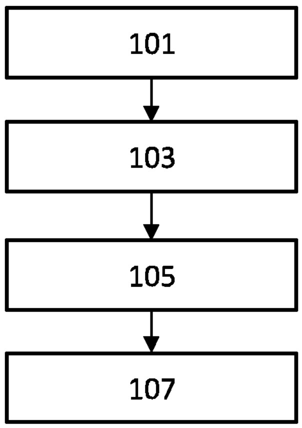
FIG. 3 is a flow diagram of a first embodiment of the method.

A first embodiment of the method of determining output information based on a recommended use of a lighting system and outputting the output information is shown in FIG. 3. A step 101 comprises determining a plurality of applications which have been installed on a device, the plurality of applications comprising a lighting control application for controlling the lighting system and one or more other applications. The one or more other applications may be used to determine an indication of interests of a user. Consequently, the one or more other applications may be used to determine a recommended use of the lighting system in a step 103 by assuming a relation between the one or more other applications installed on the device and uses of the lighting system that are of interest to the user.

Step 103 comprises determining the recommended use of the lighting system based on the one or more other applications. Determining the recommended use of the lighting system may comprise determining a recommended light scene and/or recommended light routine. For example, the lighting system can have a plurality of uses, and each of these uses can be associated with one or more applications or application types. Determination of the one or more other applications may comprise detecting applications that are associated with a use of the lighting system, or applications that belong to an application type that is associated with a use of the lighting system. The recommended use of the lighting system is then a use associated with the detected application or application type.

For example, if the one or more other applications comprise an audio and/or video streaming application, the recommended use of the lighting system can be lighting control synchronized to rendered audio and/or video. As a further example, if the one or more other applications comprise a fitness application, the recommended use of the lighting system can be a timer routine. If the one or more other applications comprise a running application and/or a cycling application, the recommended use of the lighting system can be lighting control which depends on a home or away status. If the one or more other applications comprise a security application, the recommended use of the lighting system can be a presence mimicking routine and/or a presence detection routine. Thus, in general, the recommended use may be related to the other application or other application type.

Step 105 comprises determining the output information based on the recommend use of the lighting system. Step 107 comprises outputting the output information, for example via an output interface of the device. The output information may notify the user of the recommended use. For example, the output information may specify the recommended use of the lighting system. In some embodiments, the output information may prompt the user to take action, for example to activate or implement the recommended use, or to indicate a lack of interest in the recommended use.

Figure 4:
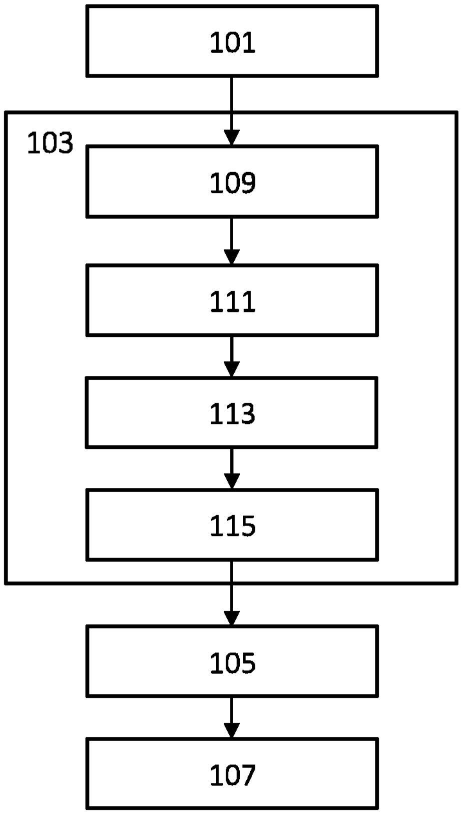
FIG. 4 is a flow diagram of a second embodiment of the method.

A second embodiment of the method of determining output information based on a recommended use of a lighting system and outputting the output information is shown in FIG. 4. Step 101 comprises determining a plurality of applications which have been installed on a device, the plurality of applications comprising a lighting control application for controlling the lighting system and one or more other applications.

Step 103 comprises determining the recommended use of the lighting system based on the one or more other applications. Step 103 comprises steps 109-115.

Step 109 comprises determining an identifier or a type of at least one of the one or more other applications. For example, a recommended use can be associated with an application type/category such as "music", "video", "security", or "games". An application can be associated with one or more categories. Some applications on the device may be associated with no category or a "miscellaneous" category. The use of application types makes it possible to map a large number of different applications on a set of potential uses of the lighting system, without having to map each individual application on one or more uses.

Step 111 comprises determining a quantity of installed applications for each of a plurality of application types based on the one or more other applications. A step 113 comprises selecting one or more of the plurality of application types based on the determined quantities, and determining the recommended use of the lighting system based on the selected one or more application types. It may be assumed that if a user has a large quantity of applications associated with one application type, that one application type has a high relevance to the user. This, in turn, makes it more likely that the user is interested in the determined output information. The number at which a quantity is considered 'large' can depend on the application type.

Step 115 comprises determining the recommended use of the lighting system based on the selected one or more other application types. Determining the use of the lighting system may comprise determining a recommended light scene and/or recommended light routine.

Step 105 comprises determining the output information based on the recommend use of the lighting system. Step 107 comprises outputting the output information. This notifies the user of the recommended use, so that the user can take action.

In other embodiments, step 103 may comprise step 109 while steps 111-115 are omitted.

Figure 5:
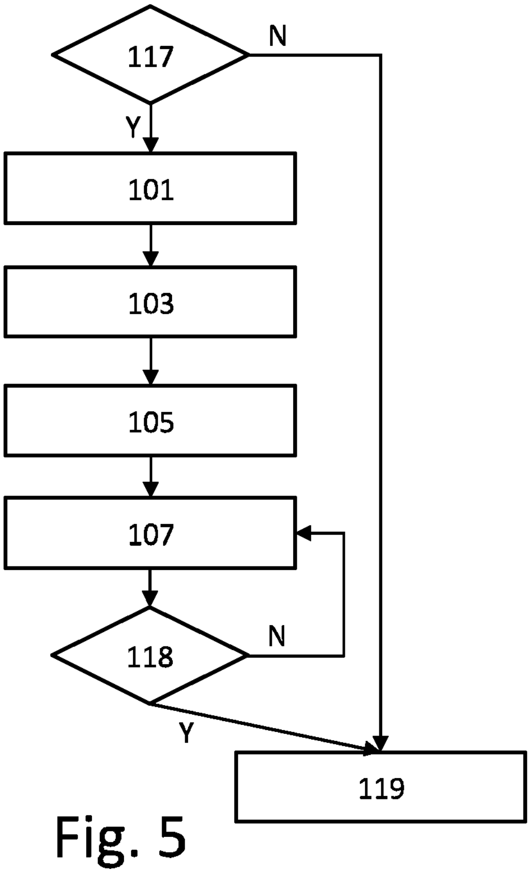
FIG. 5 is a flow diagram of a third embodiment of the method.

A third embodiment of the method of determining output information based on a recommended use of a lighting system and outputting the output information is shown in FIG. 5. The third embodiment is an extension of the first embodiment shown in FIG. 3. A step 117 comprises determining whether the lighting control application is used for the first time. If the lighting control application is used for the first time, steps 101-107 are performed. Step 101 comprises determining a plurality of applications which have been installed on a device, the plurality of applications comprising one or more other applications. Step 103 comprises determining the recommended use of the lighting system based on the one or more other applications. Step 105 comprises determining the output information based on the recommend use of the lighting system. Step 107 comprises outputting the output information.

In the depicted embodiment, a step 118 comprises determining whether a recommended use has been determined that a user has not responded to. For example, if a user has ignored the recommended use, the output information may be presented again. As another example, a plurality of recommended uses may have been determined, which are presented only one by one to the user.

If the lighting control application is not used for the first time, or after steps 101-107 have been performed and, optionally, it has been determined that the user has responded to the output information, step 119 is performed. Step 119 comprises outputting other information than a recommended use, e.g., presenting a home screen of the lighting control application.

In the embodiment of FIG. 5, the plurality of applications and the recommended use of the lighting system are determined upon detecting that the lighting control application is being used for a first time. This way, the user may be assisted to set up the lighting control application in the most suitable way. The number of uses or options available in the lighting control application can be very large, and hence potentially overwhelming to a user. Therefore, it may be desirable to present only a limited number of uses to the user. By basing the uses that are recommended to the user on the other applications installed on the device, and potentially on patterns learned from uses used by other users and the applications these other users have installed, the most relevant uses can be recommended. This is likely to improve user satisfaction.

Consequently, this embodiment may improve the application onboarding experience for the user. A new user who just installed the lighting control application and goes through the onboarding flow may be presented with suggestion to enable certain features and/or to configure certain features in a certain way. For example, one of the one or more other applications can be a video or audio streaming application such as Netflix or Spotify; in such a case, the user may be suggested to configure entertainment settings of the lighting control application, or to use an additional lighting control application, e.g., the "Hue Sync" application (potentially installed on a different device). The user may then be guided to set up the lighting system in the recommended way, e.g., synchronizing light effects with streamed video or audio content. This improves the user experience and helps engage a user during onboarding.

In another example, steps 101 and 103 are performed each time a new other application is installed on and/or removed from the device. If a new recommended use is determined based on the changed set of one or more other applications, steps 105 and 107 may be performed.

In yet another example, steps 101-107 may be performed if a new use is made available to or through the lighting control application.

Figure 6:
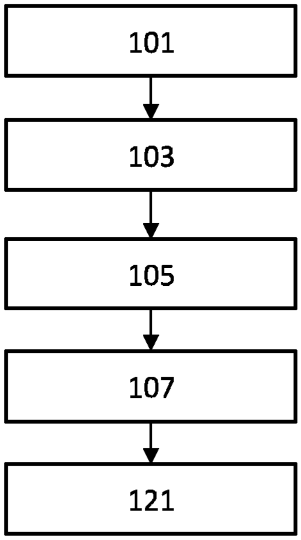
FIG. 6 is a flow diagram of a fourth embodiment of the method.

A fourth embodiment of the method of determining output information based on a recommended use of a lighting system and outputting the output information is shown in FIG. 6. The fourth embodiment is an extension of the first embodiment shown in FIG. 3. Step 101 comprises determining a plurality of applications which have been installed on a device, the plurality of applications comprising one or more other applications. Step 103 comprises determining the recommended use of the lighting system based on the one or more other applications. Step 105 comprises determining the output information based on the recommend use of the lighting system. Step 107 comprises outputting the output information. The output information may notify the user of the recommended use.

A step 121 comprises transmitting configuration information to the lighting system to configure the recommended use in the lighting system. In the depicted example, step 121 is performed after step 107. For example, step 121 may be performed in response to the user indicating that he would like to implement the recommended use. In an alternative embodiment, step 121 may be performed before, together with, or as part of step 107. This way, the user can directly experience the recommended use. This can help the user making an informed decision. In another embodiment, the configuration information is the only output information that is output and step 107 only comprises step 121.

Figure 7:
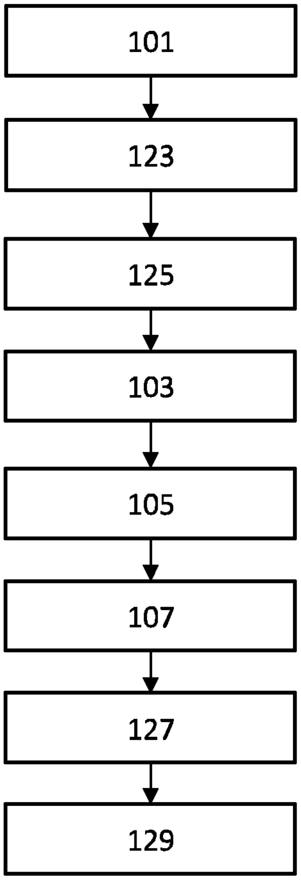
FIG. 7 is a flow diagram of a fifth embodiment of the method.

A fifth embodiment of the method of determining output information based on a recommended use of a lighting system and outputting the output information is shown in FIG. 7. Step 101 comprises determining a plurality of applications which have been installed on a device, the plurality of applications comprising one or more other applications. A step 123 comprises transmitting request information specifying the one or more other applications to a further system. The further system is an Internet server of the manufacturer of the lighting control system, for example. The further system may determine result information indicative of a recommended use of the lighting system, based on the one or more other applications specified in the request information.

A step 125 comprises receiving the result information from the further system. Step 103 comprises determining the recommended use of the lighting system based on the result information. By outsourcing a part of the process to a further device, the system itself can remain relatively lightweight, as it does not need to be able to recognize every application in order to assign an application type to the application. Moreover, the recommendations may be more accurate, as they can be based on the actual uses of other uses, as will be explained below.

Step 105 comprises determining the output information based on the recommend use of the lighting system. Step 107 comprises outputting the output information.

A step 127 comprises determining one or more actual uses of the lighting system. A step 129 comprises transmitting further output information indicative of the one or more actual uses of the lighting system to the further system. This allows the further system to determine a recommended use of another lighting system for another user based on a relation between the one or more other applications and the one or more actual uses of the lighting system. This way, a correlation may be determined between uses, e.g., features, of the lighting system that may be recommended, and the presence, quantity, and/or usage of other applications or types of applications. This, in turn, may increase the relevance of a recommended for the other user.

Figure 8:
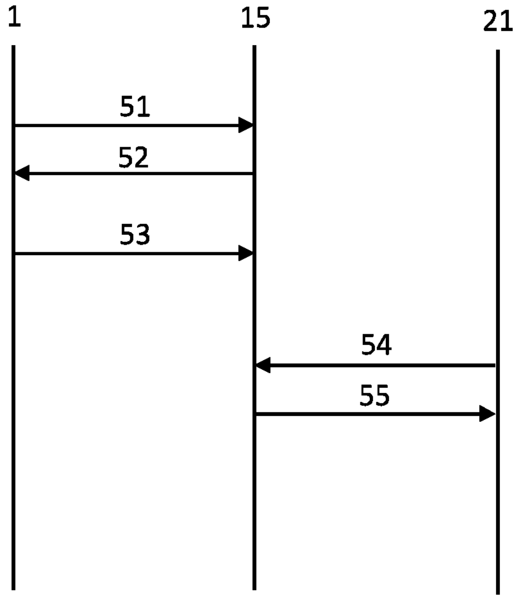
FIG. 8 exemplifies the performance of the method of FIG. 7.

FIG. 8 exemplifies the performance of the method of FIG. 7 which may be performed by, for example, the system of FIG. 2. In step 101, mobile device 1 determines one or more other applications that are installed on the mobile device 1. In step 123, mobile device 1 transmits request information 51 to the Internet server 15. The request information specifies the one or more other applications that are installed on the mobile device 1. In response, the Internet server 15 determines result information 52 indicative of a recommended use of the lighting system and transmits the result information 52 to the mobile device 1. The result information 52 is based on the one or more other applications specified in the request information. In steps 103-107, the mobile device 1 determines a recommended use based on the received result information 52, determines output information based on the determined recommended use and outputs the output information via an output interface.

In step 127, the mobile device determines one or more actual uses of the lighting system. In step 129, the mobile device 1 transmits further output information 53 indicative of the one or more actual uses of the lighting system to the Internet server 15. Steps 127 and 129 may be repeated a number of times, for example, periodically. Optionally, the mobile device 1 may also repeatedly, e.g., periodically, transmit updated information specifying the one or more other applications that are installed on the mobile device 1 at that moment; for example, every time information indicative of actual use is transmitted, information specifying the one or more other applications may be transmitted. The actual uses and the one or more other applications transmitted by the same device may be stored by the Internet server 15 in association with each other.

Over time, the Internet server 15 may accumulate a large number of actual uses and associated applications. The Internet server may analyze these data to determine correlations between installed applications or installed application types, and actual uses. The Internet server may additionally use further information about the mobile device and/or the user, if available, to improve the correlations.

At a later moment in time, another mobile device 21 may also perform step 101 and determine one or more other applications that are installed on the mobile device 21. In step 123, mobile device 21 transmits request information 54 to the Internet server 15. The request information specifies the one or more other applications that are installed on the mobile device 21. In response, the Internet server 15 determines result information 55 indicative of a recommended use of the lighting system. The result information is based on the one or more other applications specified in the request information 54 transmitted by the other mobile device 21, and on the actual uses and other applications received from mobile device 1 and, potentially, numerous other devices. The Internet server transmits the result information 55 to the other mobile device 21. In steps 103-107, the other mobile device 21 determines a recommended use based on the received result information 55, determines output information based on the determined recommended use and outputs the output information via an output interface.

The embodiments of FIGS. 3-7 differ from each other in multiple aspects, i.e. multiple steps have been added or replaced. In variations on these embodiments, only a subset of these steps is added or replaced and/or one or more steps is omitted. As a first example, steps 118 and 119 may be omitted from the embodiment of FIG. 5 and step 121 of FIG. 6 may be added to the embodiment of FIG. 7.

Figure 9:
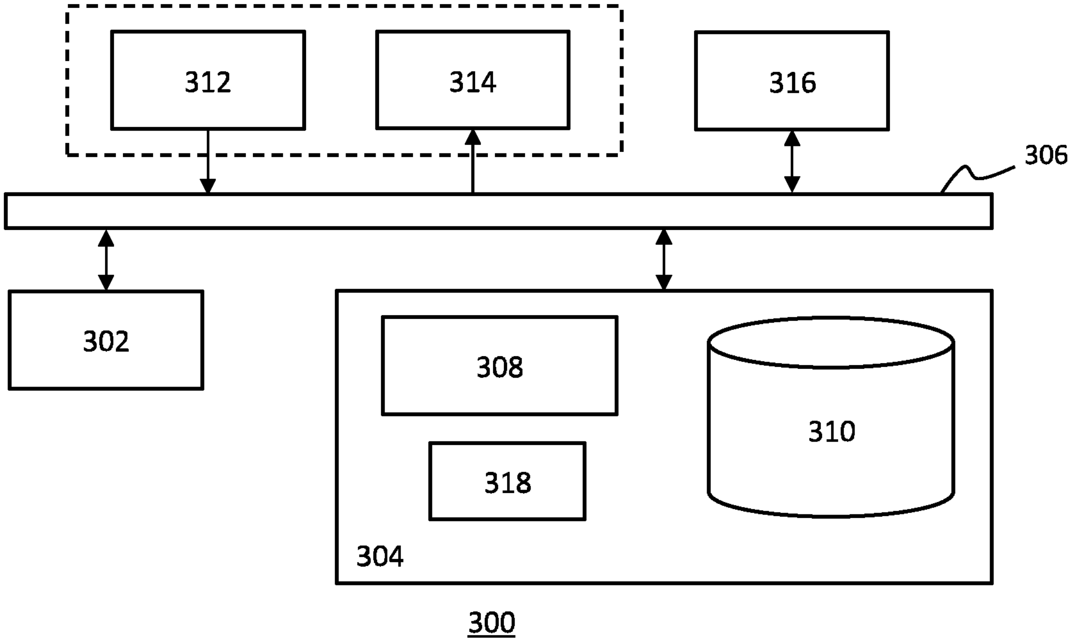
FIG. 9 is a block diagram of an exemplary data processing system for performing the method of the invention.

FIG. 9 depicts a block diagram illustrating an exemplary data processing system that may perform the method as described with reference to FIGS. 3-7.

As shown in FIG. 9, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification. The data processing system may be an Internet/cloud server, for example.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 9, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 9) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for determining output information based on a recommended use of a lighting system and outputting said output information, said system comprising:
- at least one output interface; and
- at least one processor configured to:
  - determine a plurality of applications which have been installed on a device, said plurality of applications comprising a lighting control application for controlling said lighting system and one or more other applications,
  - determine an identifier or a type of at least one of said one or more other applications,
  - determine said recommended use of said lighting system based on said recommended use being associated with said identifier or said type of said one or more other applications,
  - determine said output information based on said recommended use of said lighting system, and output said output information via said at least one output interface; wherein said at least one processor is configured to determine said plurality of applications and said recommended use of said lighting system upon detecting that said lighting control application is being used for a first time.

2. The system as claimed in claim 1, wherein said at least one processor is configured to determine a quantity of installed applications for each of a plurality of application types based on said one or more other applications, select one or more of said plurality of application types based on said determined quantities, and determine said recommended use of said lighting system based on said selected one or more application types.

3. The system as claimed in claim 1, wherein said at least one processor is configured to determine said recommended use of said lighting system by determining a recommended light scene and/or recommended light routine.

4. The system as claimed in claim 1, wherein said at least one processor is configured to output said output information by transmitting configuration information to said lighting system to configure said recommended use in said lighting system.

5. The system as claimed in claim 1, wherein said output information specifies said recommended use of said lighting system.

6. The system as claimed in claim 1, wherein said at least one processor is configured to transmit request information specifying said one or more other applications to a further system, receive result information indicative of said recommended use of said lighting system from said further system, and determine said recommended use of said lighting system based on said result information.

7. The system as claimed in claim 6, wherein said at least one processor is configured to determine one or more actual uses of said lighting system and transmit further output information indicative of said one or more actual uses of said lighting system to said further system to allow said further system to determine a recommended use of another lighting system for another user based on a relation between said one or more other applications and said one or more actual uses of said lighting system.

8. The system as claimed in claim 1, wherein said at least one processor determines lighting control synchronized to rendered audio and/or video as said recommended use of said lighting system if said one or more other applications comprise an audio and/or video streaming application.

9. The system as claimed in claim 1, wherein said at least one processor determines a timer routine as said recommended use of said lighting system if said one or more other applications comprise a fitness application.

10. The system as claimed in claim 1, wherein said at least one processor determines lighting control which depends on a home or away status as said recommended use of said lighting system if said one or more other applications comprise a running application and/or a cycling application.

11. The system as claimed in claim 1, wherein said at least one processor determines a presence mimicking routine and/or a presence detection routine as said recommended use of said lighting system if said one or more other applications comprise a security application.

12. A method of determining output information based on a recommended use of a lighting system and outputting said output information, said method comprising:

determining a plurality of applications which have been installed on a device, said plurality of applications comprising a lighting control application for controlling said lighting system and one or more other applications;

determining an identifier or a type of at least one of said one or more other applications;

determining said recommended use of said lighting system based on said identifier or said type of said one or more other applications;

determining said output information based on said recommend use of said lighting system; and outputting said output information;

wherein determining said plurality of applications and said recommended use of said lighting system is performed upon detecting that said lighting control application is being used for a first time.

13. A non-transitory computer readable medium comprising computer program code to perform the method of claim 12 when run on a processor.

* * * * *